(12) United States Patent
Jagadeesan et al.

(10) Patent No.: US 7,012,901 B2
(45) Date of Patent: Mar. 14, 2006

(54) DEVICES, SOFTWARE AND METHODS FOR GENERATING AGGREGATE COMFORT NOISE IN TELECONFERENCING OVER VOIP NETWORKS

(75) Inventors: Ramanathan Jagadeesan, San Jose, CA (US); Luke K. Surazski, Santa Clara, CA (US)

(73) Assignee: Cisco Systems, Inc., San Jose, CA (US)

( * ) Notice: Subject to any disclaimer, the term of this patent is extended or adjusted under 35 U.S.C. 154(b) by 856 days.

(21) Appl. No.: 09/796,400

(22) Filed: Feb. 28, 2001

(65) Prior Publication Data

US 2002/0118650 A1    Aug. 29, 2002

(51) Int. Cl.
*H04L 12/16* (2006.01)
(52) U.S. Cl. .................. 370/260; 370/352; 370/356
(58) Field of Classification Search ........ 370/260–266, 370/269, 352, 356, 353, 354, 401
See application file for complete search history.

(56) References Cited

U.S. PATENT DOCUMENTS

| | | | | |
|---|---|---|---|---|
| 5,960,389 A | * | 9/1999 | Jarvinen et al. ............. | 704/220 |
| 5,978,760 A | * | 11/1999 | Rao et al. .................... | 704/226 |
| 5,991,716 A | * | 11/1999 | Lehtimaki ................... | 704/212 |
| 6,463,414 B1 | * | 10/2002 | Su et al. .................. | 704/270.1 |
| 6,625,284 B1 | * | 9/2003 | Ariyama ..................... | 381/66 |
| 6,631,139 B1 | * | 10/2003 | El-Maleh et al. ........... | 370/466 |
| 6,643,617 B1 | * | 11/2003 | Wood et al. ................ | 704/226 |
| 6,662,155 B1 | * | 12/2003 | Rotola-Pukkila et al. ... | 704/228 |
| 6,697,342 B1 | * | 2/2004 | Smyth et al. ............... | 370/260 |
| 6,707,821 B1 | * | 3/2004 | Shaffer et al. ........... | 370/395.4 |
| 6,708,147 B1 | * | 3/2004 | Mekuria et al. ............ | 704/228 |
| 6,839,356 B1 | * | 1/2005 | Barany et al. ............. | 370/401 |
| 6,845,389 B1 | * | 1/2005 | Sen et al. .................... | 709/204 |
| 2001/0046843 A1 | * | 11/2001 | Alanara et al. ............... | 455/95 |
| 2002/0006137 A1 | * | 1/2002 | Rabenko et al. ............ | 370/466 |
| 2002/0116186 A1 | * | 8/2002 | Strauss et al. ............. | 704/233 |
| 2005/0018798 A1 | * | 1/2005 | Li .............................. | 375/355 |

* cited by examiner

*Primary Examiner*—Frank Duong
*Assistant Examiner*—Michael J. Moore
(74) *Attorney, Agent, or Firm*—Marger Johnson & McCollom, P.C.

(57) ABSTRACT

Devices, software and methods are provided for generating aggregate comfort noise for teleconferencing over IP networks. A transcoding component includes a decoder for decoding streams of packets. A summing component has a summer with summing inputs to receive the decoded streams of packets. The summing component has at least one silence flag input, and an additional signaling path is used by the transcoding component to signal to the silence flag input if any of the decoded streams of packets includes a silence identification packet. In another embodiment, the summing component may or may not include the silence flag input, but the device includes an aggregate comfort noise generation component. The aggregate comfort noise may be programmed to be a balanced representation of all background noises.

22 Claims, 5 Drawing Sheets

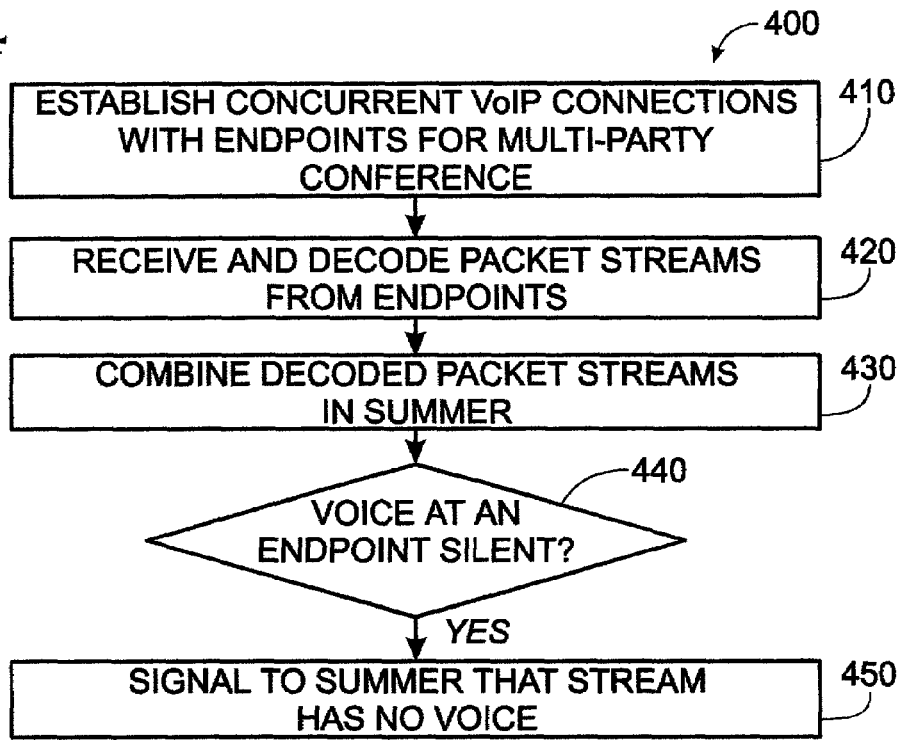
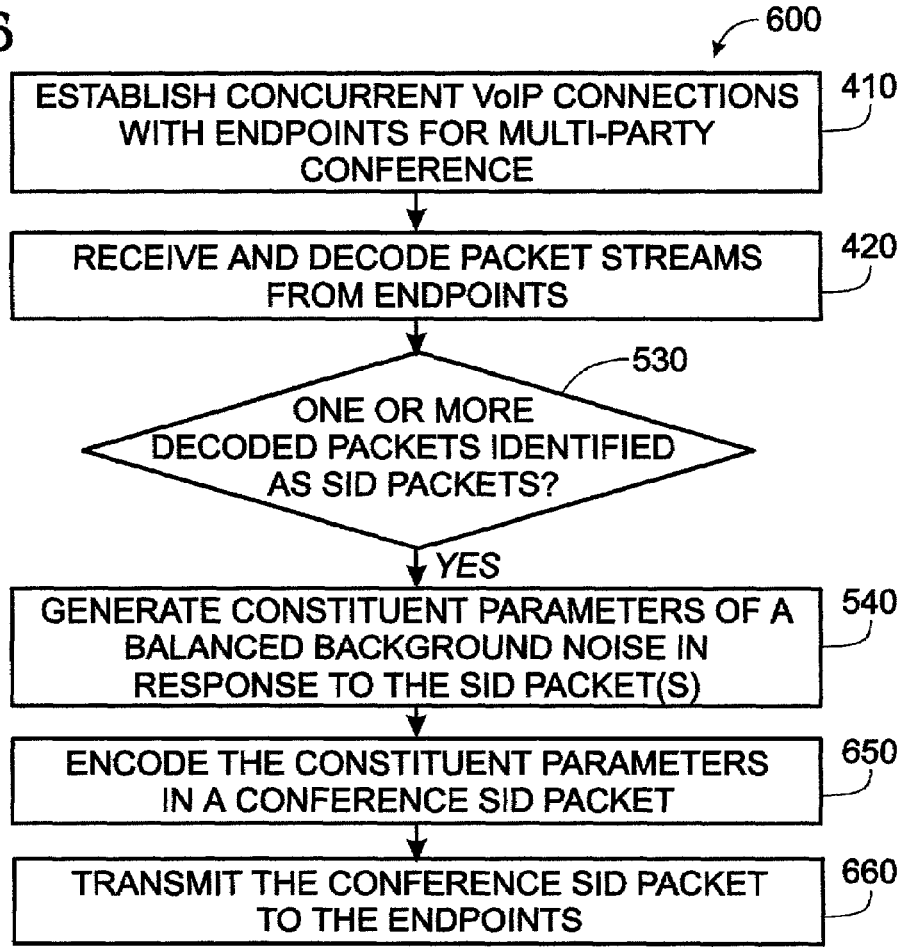

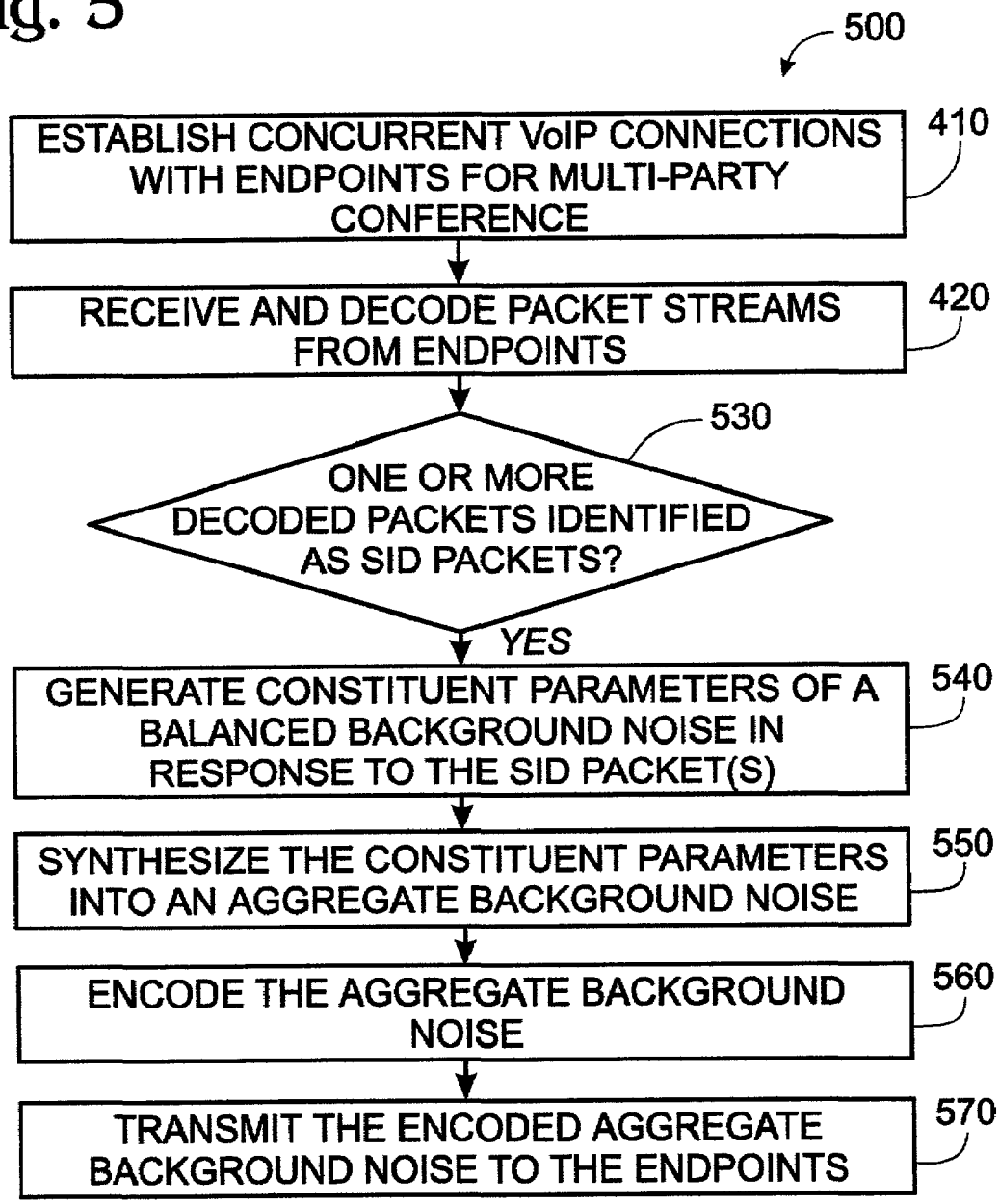

DEVICES, SOFTWARE AND METHODS FOR GENERATING AGGREGATE COMFORT NOISE IN TELECONFERENCING OVER VOIP NETWORKS

BACKGROUND OF THE INVENTION

1. Field of the Invention.

The present invention is related to the field of telephony using Voice over IP networks, and more specifically to devices, software and methods for teleconferencing over such networks.

2. Description of the Related Art.

Packet switched networks and related devices are becoming very efficient for voice communications. More specifically, two people can have a telephone conversation via a packet switched network using Voice over Internet Protocol (VoIP).

Often an encoder of the device of one person in a conversation includes a Voice Activity Detection (VAD) module. When the VAD module determines that the person is not speaking, it pauses transmitting sound, because that sound would be only background noise (also known as source noise). The pause conserves bandwidth, for as long as the user is silent. Instead of the full packetized audio stream, the encoder may occasionally transmit a Silence Indication ("SID") packet, to indicate the connection is still open, but the user remains silent.

When this feature is activated, the one of the two who speaks will be hearing absolutely nothing. One result of this is that he may not know whether the line may have been disconnected. Not knowing is disconcerting, especially for those who are used to regular telephone lines, where some background noise can be heard faintly. The disconcerted speaker might feel compelled to interrupt the flow of conversation regularly, e.g. by asking the other person a question, to continue ascertaining whether the connection is still good.

This problem has been ameliorated in the prior art by generating and playing out, in addition to the voices, a faint background noise to the participants while the connection is open. The faint noise gives the participants the comforting knowledge that the line is still open, which is why it is also known as comfort noise.

The comfort noise is generated by sampling a snapshot of the actual background noise of one participant, and encoding parameters of it in the SID packet. The encoded parameters may include background noise level, or level in each of the frequency components that makes the background noise. Once the SID packet is received, background noise is generated, and played continuously to the other participant.

The generation of comfort noise by each participant presents problems when there is multi-party voice conferencing. These problems are now described, after a more detailed explanation of how voice conferencing works.

Referring to FIG. 1, an arrangement for a multi-party voice conference is shown. A conference bridge 100 is used to help conduct a multi-party conference between four network endpoints 122, 124, 126 and 128, corresponding respectively to User A, User B, User C and User D. Conference bridge 100 establishes, through an Internet Protocol (IP) cloud 110, respective VoIP connections 132, 134, 136, 138 with the four endpoints 122, 124, 126 and 128.

Each user can speak to all the others through conference bridge 100. Each endpoint 122, 124, 126, 128 generates an encoded packetized audio stream that is sent over the respective connections 132, 134, 136, 138 to conference bridge 100. Conference bridge 100 adds the received voices, and plays them to the participants, as is described below.

Conference bridge 100 includes a transcoding component 140. Transcoding component 140 includes a decoder 144 (also known as decoding portion 144), and an encoder 148 (also known as encoding portion 148). Transcoding component 140 preferably handles many different types of codecs (coder-encoder pairs), so as to be compatible with many different types of endpoints.

Decoder 144 receives four streams of packets 172, 174, 176 and 178 from endpoints 122, 124, 126, 128 respectively. The streams are channeled through decoder 144, which converts them into voice data.

Conference bridge 100 also includes a summing component 160, which encompasses a summer 164 (also known as adder 164). Summer 164 receives the voice data from decoder 144, and sums it into single streams of voice data, one for each user. Only a single such stream 180 is shown in FIG. 1, and that is for not complicating unnecessarily FIG. 1. Stream 180 is shown as receiving all the inputs to convey the main idea, while this may not be necessarily the exact configuration. In better applications, each stream is destined for one of the participants. That stream does not receive that participant's own input.

Encoder 148 receives stream 180, and encodes it suitably for each of the codecs of each of the endpoints. Encoder 148 thus outputs four streams of packets 192, 194, 196, 198 that are transmitted respectively to endpoints 122, 124, 126, 128 over the respective VoIP connections 132, 134, 136, 138. This way, every one of endpoints 122, 124, 126, 128 receives an aggregate of all the inputs.

In a multi-party conference scenario, one of the users is typically the active speaker, while the others are silent. In such a case, summer 164 may receive comfort noise from all the remaining speakers. Summer 164 may reject some of them, as being not loud compared to the speech of the active speaker.

If the active speaker pauses, or if there is silence by all the parties, then summer 164 receives only background noise from each of the channels. This is an undesirable situation for a number of reasons.

First, summer 164 always selects at least the loudest ones of the encoded background noises, and adds them for all the participants. Once these are added, they may be misidentified by encoder 148 as speech, not background noise.

Second, as the audio streams may be derived from different codecs, the encoding of the background noise levels may be mismatched. A low background noise level may dominate the background noise of the overall conference simply due to different encoding. The phenomenon is worse if that background noise were not the one intended to dominate.

Third, as the levels of comfort noise from each channel change, or if two happen to be encoded such that their results are very similar, the selection algorithm of summer 164 may hop from one channel to the other. The active speaker especially may hear pops, clicks, and gargling noises, which is annoying.

BRIEF SUMMARY OF THE INVENTION

The present invention overcomes these problems and limitations of the prior art.

Generally, the present invention provides devices, software and methods for generating aggregate comfort noise for teleconferencing over IP networks.

A device according to an embodiment of the invention includes a transcoding component that has a decoder for decoding streams of packets. The device also includes a summing component having a summer with summing inputs to receive the decoded streams of packets. The summing component has at least one silence flag input, and the device also includes an additional signaling path for the transcoding component to signal to the silence flag input if any of the decoded streams of packets includes a silence identification packet.

In another embodiment, the summing component may or may not include the silence flag input, but the device includes an aggregate comfort noise generation component. This causes the participants to listen to an aggregate background noise.

A method according to an embodiment of the invention includes establishing a plurality of concurrent VoIP connections with respective endpoints, and receiving packets from the VoIP connections of at least two of the endpoints. The method includes identifying at least one of the received packets as a silence identification packet, and generating constituent parameters of a balanced background noise in response to the identified packet. The constituent parameters may be generated from source noise parameters of the identified packet.

The invention results in voice conferencing over IP networks with a regular sounding aggregate comfort noise, without sudden level changes. The aggregate comfort noise may be programmed to be a balanced representation of all background noises, without being dominated by the loudest one.

The invention offers the additional advantage that bandwidth is conserved. Indeed, comfort noise from individual participants is not unnecessarily generated or reencoded, as in the prior art.

The invention will become more readily apparent from the following Detailed Description, which proceeds with reference to the drawings, in which:

BRIEF DESCRIPTION OF THE DRAWINGS

FIG. 4 is a flowchart illustrating a method according to an embodiment of the present invention.

FIG. 5 is a flowchart illustrating a method according to another embodiment of the present invention.

FIG. 6 is a flowchart illustrating a method according to yet another embodiment of the present invention.

DETAILED DESCRIPTION OF THE PREFERRED EMBODIMENT(S)

As has been mentioned, the present invention provides devices, software and methods for generating aggregate comfort noise for teleconferencing over IP networks. The invention is now described in more detail.

Figure 2:
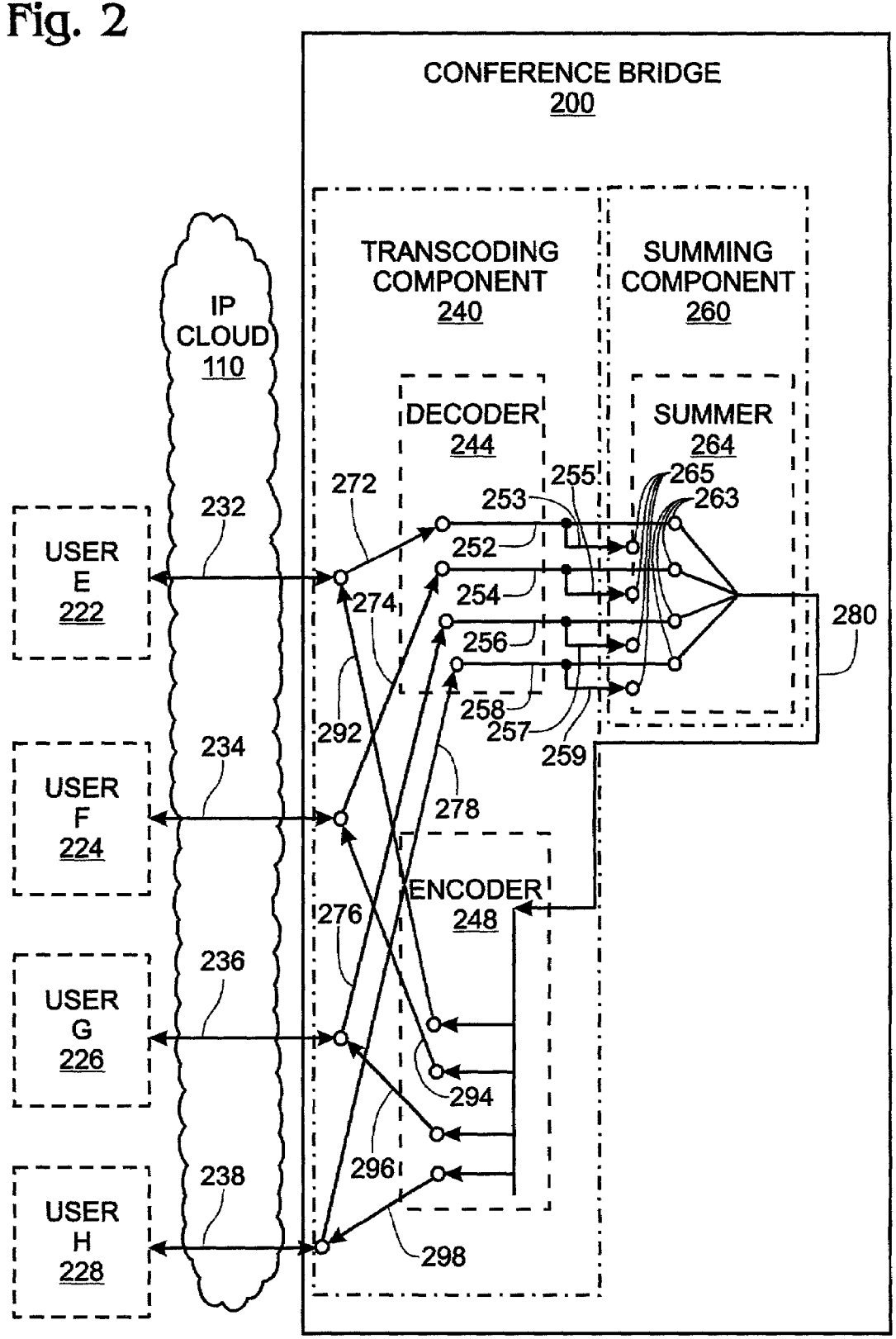
FIG. 2 is a block diagram for an arrangement for VoIP conferencing using a conference bridge according to an embodiment of the present invention.

Referring now to FIG. 2, a conference bridge 200 is described. Conference bridge 200 is a device that may be connected to a network, such as Internet Protocol (IP) cloud 110. Conference bridge 200 may facilitate User E, User F, User G and User H at respective network endpoints 222, 224, 226, 228 carry out a conference call with each other through IP cloud 110.

Conference bridge 200 includes a network interface (not shown separately). The network interface permits conference bridge 200 to establish VoIP connections 232, 234, 236 and 238 respectively with User E, User F, User G and User H through network 110.

Each user can speak to all the others through conference bridge 100. Each endpoint 222, 224, 226, 228 generates an encoded packetized audio stream that is sent over the respective connections 232, 234, 236, 238 to conference bridge 200. Conference bridge 200 combines their voices, and plays them back.

Conference bridge 200 includes a transcoding component 240. Transcoding component 240 includes a decoder 244 (also known as decoding portion 244), and an encoder 248 (also known as encoding portion 248). Transcoding component 240 preferably handles many different types of codecs (coder-encoder pairs), so as to be compatible with many different types of endpoints.

Decoder 244 receives four streams of packets 272, 274, 276 and 278 respectively from endpoints 222, 224, 226, 228. The streams are channeled through decoder 244, which converts them into voice data. The streams are channeled through four channels 252, 254, 256, 258 respectively.

Figure 1:
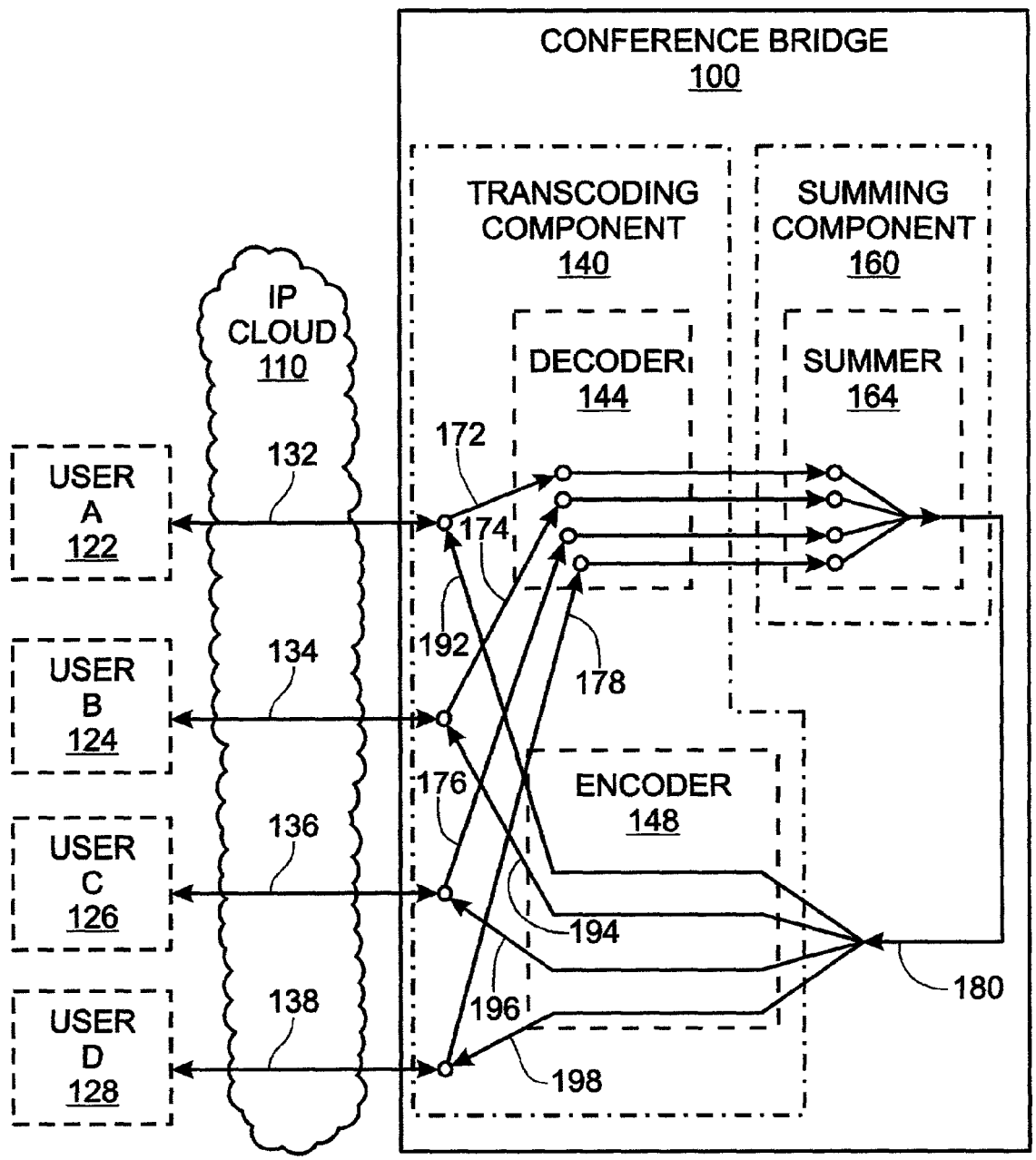
FIG. 1 is a block diagram for an arrangement for VoIP conferencing using a conference bridge in the prior art.

Conference bridge 200 also includes a summing component 260, which encompasses a summer 264 (also known as adder 264). Summer 264 receives the voice data from decoder 244, and sums it into single streams of voice data, one for each user. Only a single such stream 280 is shown in FIG. 1, and that is for not complicating unnecessarily FIG. 2. Stream 280 is shown as receiving all the inputs to convey the main idea, while this may not be necessarily the exact configuration. In better applications, each stream is destined for each one of the participants. That stream does not receive that participant's own input.

Encoder 248 receives stream 280, and encodes it suitably for each of the codecs of each of the endpoints. Encoder 248 thus outputs four streams of packets 292, 294, 296, 298 that are transmitted respectively to endpoints 222, 224, 226, 228 over the respective VoIP connections 232, 234, 236, 238. This way, every one of endpoints 222, 224, 226, 228 receives an aggregate of the inputs.

Summer 264 is now described in more detail. Summer 264 has four inputs 263 for receiving the output of channels 252, 254, 256, 258. Summer 264 then sums the voice data of channels 252, 254, 256, 258. To do this, the summer 264 aggregates the voice data in some instances. In other instances, it selects a number of the loudest channels, and then sums them.

In one embodiment of the invention, summer 264 includes at least one silence flag input. In the embodiment of FIG. 2, summer 264 includes four silence flag inputs 265. It will be recognized that these correspond to channels 252, 254, 256, 258.

In the same embodiment, a conference bridge made according to the invention also includes at least one additional signaling path for the transcoding component 240 to signal to the silence flag inputs 265 if any of the decoded streams of packets includes a silence identification packet. In the embodiment of FIG. 2, conference bridge 200 includes four additional signaling paths 253, 255, 257, 259. It will be recognized that these correspond respectively to channels 252, 254, 256, 258. Signaling paths 253, 255, 257, 259 are used to signal to summer 264 whether the corresponding channels 252, 254, 256, 258 include a silence identification packet.

Once summer 264 receives a signal that a specific one of channels 252, 254, 256, 258 include a silence identification packet, it can act as programmed. For example, it may be programmed to ignore that channel.

Figure 3:
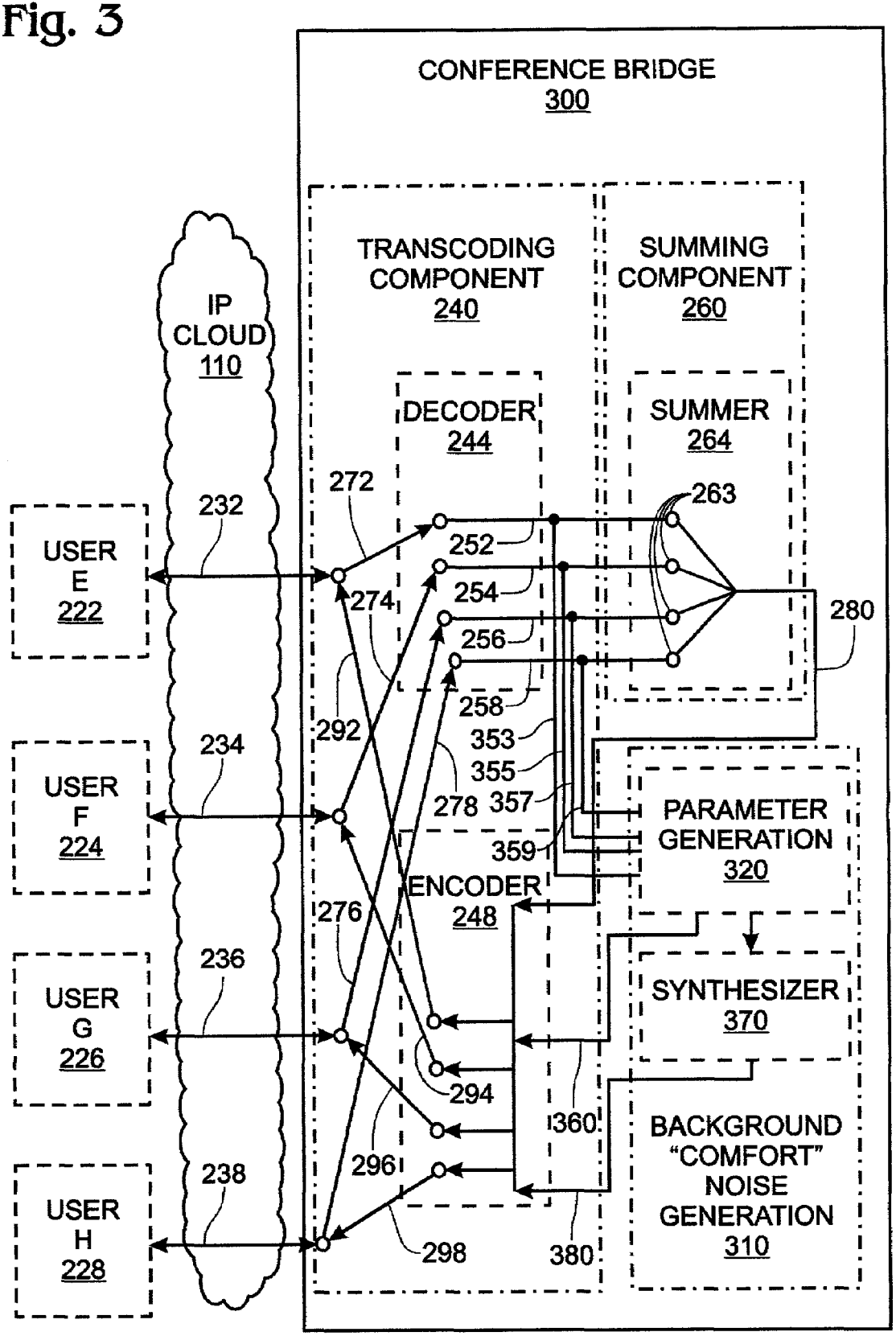
FIG. 3 is a block diagram for an arrangement for VoIP conferencing using a conference bridge according to another embodiment of the present invention.

Referring now to FIG. 3, a conference bridge 300 according to another embodiment of the invention is now described. The reader will identify many similarly numbered components as conference bridge 200 of FIG. 2.

In the second embodiment, conference bridge 200 includes a comfort noise generation component 310. Component 310 is adapted to transmit an aggregate background noise to at least one of the users at endpoints 222, 224, 226, 228 via the IP cloud 110.

In one embodiment, comfort noise generation component 310 includes a parameter generation component 320. Parameter generation component 320 is adapted to generate constituent components for the aggregate background noise from information in the decoded packets. Parameter generation component 320 may be programmed such that the constituent components are a balanced representation of the inputs.

In one embodiment, parameter generation component 320 may feed its output to encoder 248 directly, as a stream 360. Encoder 248 may generate a conference SID packet, and transmit it to the participants.

Alternately, comfort noise generation component 310 may further include a synthesizer 370 to synthesize the constituent components into comfort noise. Synthesizer 370 then may feed its output to encoder 248 as a stream 380, for encoding the synthesized comfort noise.

It will be understood that, in the embodiment of FIG. 3, additional signaling paths 253, 255, 257, 259 may be optionally provided, or may be redirected into a different component.

In addition, embodiments that use additional signaling paths 353, 355, 357, 359 may not need noise generator 310. Alternatively, noise generator 310 may be used with or without additional signaling paths 353, 355, 357, 359.

It is readily apparent that the present invention may be implemented by one or more devices that include logic circuitry. It may also be implemented by a device that includes a dedicated processor system, which may include a microcontroller or a microprocessor.

The invention additionally provides methods, which are described below. Moreover, the invention provides apparatus that performs, or assists in performing the methods of the invention. This apparatus may be specially constructed for the required purposes, or it may comprise a general-purpose computer selectively activated or reconfigured by a computer program stored in the computer. The methods and algorithms presented herein are not necessarily inherently related to any particular computer or other apparatus. In particular, various general-purpose machines may be used with programs in accordance with the teachings herein, or it may prove more convenient to construct more specialized apparatus to perform the required method steps. The required structure for a variety of these machines will appear from this description. Useful machines or articles for performing the operations of the present invention include general-purpose digital computers or other similar devices. In all cases, there should be borne in mind the distinction between the method of operating a computer and the method of computation itself. The present invention relates also to method steps for operating a computer and for processing electrical or other physical signals to generate other desired physical signals.

The invention additionally provides a program, and a method of operation of the program. The program is most advantageously implemented as a program for a computing machine, such as a general-purpose computer, a special purpose computer, a microprocessor, etc. For example, FIG. 2 can be used as a guide for constructing software modules according to the invention, with each component being a software module.

The invention also provides a storage medium that has the program of the invention stored thereon. The storage medium is a computer-readable medium, such as a memory, and is read by the computing machine mentioned above.

A program is generally defined as a sequence of steps leading to a desired result. These steps, also known as instructions, are those requiring physical manipulations of physical quantities. Usually, though not necessarily, these quantities take the form of electrical or magnetic signals capable of being stored, transferred, combined, compared, and otherwise manipulated or processed. When stored, they may be stored in any computer-readable medium. It is convenient at times, principally for reasons of common usage, to refer to these signals as bits, data bits, samples, values, elements, symbols, characters, images, terms, numbers, or the like. It should be borne in mind, however, that all of these and similar terms are associated with the appropriate physical quantities, and that these terms are merely convenient labels applied to these physical quantities. This detailed description is presented largely in terms of flowcharts, display images, algorithms, and symbolic representations of operations of data bits within a computer readable medium, such as a memory. Such descriptions and representations are the type of convenient labels used by those skilled in programming and/or the data processing arts to effectively convey the substance of their work to others skilled in the art. A person skilled in the art of programming may use this description to readily generate specific instructions for implementing a program according to the present invention. For the sake of economy, however, flowcharts used to describe methods of the invention are not repeated in this document for describing software according to the invention.

Often, for the sake of convenience only, it is preferred to implement and describe a program as various interconnected distinct software modules or features, collectively also known as software. This is not necessary, however, and there may be cases where modules are equivalently aggregated into a single program with unclear boundaries. In any event, the software modules or features of the present invention may be implemented by themselves, or in combination with others. Even though it is said that the program may be stored in a computer-readable medium, it should be clear to a person skilled in the art that it need not be a single memory, or even a single machine. Various portions, modules or features of it may reside in separate memories, or even separate machines. The separate machines may be connected directly, or through a network, such as a local access network (LAN), or a global network, such as the Internet.

In the present case, methods of the invention are implemented by machine operations. In other words, embodiments of the program of the invention are made such that they perform methods of the invention that are described in this document. These may be optionally performed in conjunction with one or more human operators performing some, but not all of them. As per the above, the users need not be collocated with each other, but each only with a machine that houses a portion of the program. Alternately, some of these machines may operate automatically, without users and/or independently from each other.

Methods of the invention are now described.

Referring now to FIG. 4, a flowchart 400 is used to illustrate a method according to an embodiment of the invention.

According to a box 410, concurrent VoIP connections are established with at least two network endpoints, for a multi-party conference between users who are at the endpoints.

According to a next box 420, packet streams are received from the endpoints via the established respective connections. The received packet streams are then decoded, to yield voice data.

According to a next box 430, the decoded packet streams are combined in a summer.

According to a next box 440, it is determined whether the voice at an endpoint is silent. The voice being silent does not mean that there is no noise, such as background noise. It only means that there is no recognizable voice by the speaker. Determining may be by examining whether there is a SID packet in the stream.

If yes, then according to a next box 450, a signal is sent to the summer that the stream has no voice. The signal may be sent through an additional signaling path.

Referring now to FIG. 5, a flowchart 500 is used to illustrate a method according to another embodiment of the invention.

Boxes 410 and 420 are identical to boxes 410 and 420 respectively of the previous figure. Their discussion will thus not be repeated.

According to box 530 it is determined whether a decoded packet is identified as a SID packet. If not, then the process continues normally. It may be advantageously also inquired whether SID packets have been identified in other ones of the streams.

If yes, then according to box 540, then constituent parameters are generated of a balanced background noise in response to the one or more SID packets. In addition, the constituent parameters may be determined from source noise parameters that have been encoded in the identified SID packets. For example, the constituent parameters may be generated by power averaging over frequency components of the source noise parameters.

According to a next box 550, the constituent parameters are synthesized into an aggregate background noise.

According to a next box 560, the synthesized aggregate background noise is encoded.

According to a next box 570, the encoded aggregate background noise may then be transmitted to the endpoints for the users.

Referring now to FIG. 6, a flowchart 600 is used to illustrate a method according to yet another embodiment of the invention.

Boxes 410, 420, 530 and 540 are identical to boxes 410, 420, 530 and 540 respectively of the previous figure. Their discussion will thus not be repeated.

According to a next box 650, the constituent parameters are encoded in a conference SID packet. This avoids box 550 of FIG. 5

According to a next box 660, the conference SID packet is transmitted to the appropriate endpoint(s).

A person skilled in the art will be able to practice the present invention in view of the description present in this document, which is to be taken as a whole. Numerous details have been set forth in order to provide a more thorough understanding of the invention. In other instances, well-known features have not been described in detail in order not to obscure unnecessarily the invention.

While the invention has been disclosed in its preferred form, the specific embodiments as disclosed and illustrated herein are not to be considered in a limiting sense. Indeed, it should be readily apparent to those skilled in the art in view of the present description that the invention may be modified in numerous ways. The inventor regards the subject matter of the invention to include all combinations and subcombinations of the various elements, features, functions and/or properties disclosed herein.

The following claims define certain combinations and subcombinations, which are regarded as novel and non-obvious. Additional claims for other combinations and subcombinations of features, functions, elements and/or properties may be presented in this or a related document.

The invention claimed is:

1. A teleconferencing device comprising:
   a transcoding component having a decoder for decoding streams of packets received concurrently from different users via a network;
   a summing component having a summer with summing inputs to receive the decoded streams of packets and at least one silence flag input; and
   an additional signaling path for the transcoding component to signal to the silence flag input of the summing component if any of the decoded streams of packets includes a silence identification packet.

2. A device comprising:
   a transcoding component having a decoder for decoding streams of packets received concurrently from different users via a network;
   a summing component having a summer to combine the decoded streams of packets;
   a comfort noise generation component for generating an aggregate background noise for at least one of the users; and
   an additional signaling path for the transcoding component to signal to the comfort noise generation component if any of the decoded streams of packets includes a silence identification packet.

3. The device of claim 2, wherein
   the comfort noise generation component includes a parameter generation component to generate constituent components for the aggregate background noise from information in the decoded streams of packets.

4. The device of claim 3, wherein
   the comfort noise generation component further includes a synthesizer to synthesize the constituent components into comfort noise.

5. A teleconferencing device comprising:
   means for decoding streams of packets received concurrently from different users via a network;
   means for summing to combine the decoded streams of packets; and
   means for generating an aggregate background noise for at least one of the users packets, the means for generating including a means for receiving a silence identification packet.

6. The teleconferencing device of claim 5, wherein
   the means for generating the aggregate background noise includes a means for generating constituent components for the aggregate background noise from information in the decoded streams of packets.

7. The teleconferencing device of claim 6, wherein
the means for generating the aggregate background noise further includes a synthesizer to synthesize the constituent components into comfort noise.

8. A device comprising:
a network interface for coupling to a network; and
a processor coupled with the network interface, wherein the processor is configured to:
establish a plurality of concurrent VoIP connections with respective endpoints through the network;
receive respective streams of packets from at least two of the endpoints;
decode the received streams of packets;
combine the decoded streams of packets in a summer;
determine whether one of the streams includes a silent voice; and
if so, issue a signal to the summer.

9. The device of claim 8, wherein
determining is by detecting a silence identification packet in the stream.

10. An article comprising: a storage medium, said storage medium having stored thereon instructions, that, when executed by at least one device, result in:
establishing a plurality of concurrent VoIP connections with respective endpoints;
receiving respective streams of packets from at least two of the endpoints via their respective VoIP connections;
identifying at least one of the received packets as a silence identification packet;
indicating from a transcoder to a comfort noise generator when at least one of the received packets is a silence identification packet; and
generating constituent parameters of a balanced background noise in response to the identified packet.

11. The article of claim 10, wherein
the constituent parameters are generated from source noise parameters of the identified packet.

12. The article of claim 11, wherein
the constituent parameters are generated by power averaging over frequency components of the source noise parameters.

13. The article of claim 10, wherein the instructions further result in:
synthesizing the constituent parameters into an aggregate background noise; and
encoding the synthesized aggregate background noise.

14. The article of claim 10, wherein the instructions further result in:
encoding the constituent parameters in a conference silence identification packet; and
transmitting the conference silence identification packet to at least one of the endpoints.

15. A method comprising:
establishing a plurality of concurrent VoIP connections with respective endpoints;
receiving respective streams of packets from at least two of the endpoints via their respective VoIP connections;
decoding the received streams of packets;
combining the decoded streams of packets in a summer;
determining whether one of the streams includes a silent voice; and
if so, signaling to the summer.

16. The method of claim 15, wherein
determining is by detecting a silence identification packet in the streams.

17. A method comprising:
establishing a plurality of concurrent VoIP connections with respective endpoints;
receiving respective streams of packets from at least two of the endpoints via their respective VoIP connections;
identifying at least one of the received packets as a silence identification packet; and
upon identifying the silence identification packet, signaling from a transcoder to a comfort noise generator; and
generating constituent parameters of a balanced background noise in response to the identified packet.

18. The method of claim 17, wherein
the constituent parameters are generated from source noise parameters of the identified packet.

19. The method of claim 18, wherein
the constituent parameters are generated by power averaging over frequency components of the source noise parameters.

20. The method of claim 17, further comprising:
synthesizing the constituent parameters into an aggregate background noise; and
encoding the synthesized aggregate background noise.

21. The method of claim 17, further comprising:
encoding the constituent parameters in a conference silence identification packet; and
transmitting the conference silence identification packet to at least one of the endpoints.

22. The method of claim 21, wherein transmitting the conference silence identification packet further includes transmitting the conference silence identification from a teleconferencing device to a plurality of endpoints.

* * * * *